United States Patent [19]
Nishijima et al.

[11] 3,931,754
[45] Jan. 13, 1976

[54] SKIVING CUTTER DEVICE FOR USE IN CUTTING INTERNAL SPUR GEAR

[75] Inventors: Komio Nishijima, Komatsu; Masakazu Kojima, Kanazawa, both of Japan

[73] Assignee: Kabushiki Kaisha Komatsu Seisakusho, Japan

[22] Filed: Nov. 12, 1974

[21] Appl. No.: 523,136

[52] U.S. Cl. .................... 90/7; 29/103 C; 90/7.5
[51] Int. Cl.² ............... B23F 1/06; B26D 1/12
[58] Field of Search ...... 29/103, 103 B, 103 C, 104; 90/6, 7, 7.5, 8

[56] References Cited
UNITED STATES PATENTS

| | | | |
|---|---|---|---|
| 879,531 | 2/1908 | Fellows | 90/7 |
| 1,998,835 | 4/1935 | Fellows | 90/7.5 |
| 2,125,873 | 8/1938 | Aeberli | 90/7 |
| 2,168,488 | 8/1939 | Miller | 90/7.5 |
| 2,282,193 | 5/1942 | Lambrix | 90/7.5 |
| 2,336,760 | 12/1943 | Sykes | 90/7.5 |
| 3,399,599 | 9/1968 | Looman et al. | 90/7 X |
| 3,570,367 | 3/1971 | Looman et al. | 90/7 X |

FOREIGN PATENTS OR APPLICATIONS

| | | | |
|---|---|---|---|
| 854,830 | 1/1940 | France | 90/8 |
| 932,046 | 8/1955 | Germany | 90/7.5 |
| 388,068 | 5/1965 | Switzerland | 90/8 |

*Primary Examiner*—Harrison L. Hinson
*Attorney, Agent, or Firm*—Armstrong, Nikaido & Wegner

[57] ABSTRACT

A skiving cutter device for use in cutting an internal spur gear having rough and finish skiving cutters with cutter blades mounted in vertical arrangement on a spindle and spacers adapted to compensate respective distances between the cutters and a reference plane on the spindle. Respective cutter blades of the cutters are located in the same phase and each tooth profile thereof is designed such that the contacting point between each cutter blade of the cutters and each gear tooth of an internal spur gear to be obtained is located within a contacting or acting rejion therebetween. The device is further provided with spiral key ways respectively formed in the cutters and pin keys set up on the spindle and engaged with the key ways, respectively.

2 Claims, 7 Drawing Figures

3,931,754

SKIVING CUTTER DEVICE FOR USE IN CUTTING INTERNAL SPUR GEAR

BACKGROUND OF THE INVENTION

1. Field of the Invention:

This invention relates to a skiving cutter device for use in cutting an internal spur gear.

2. Description of the Prior Art:

In usual gear skiving processes for manufacturing an internal spur gear, a skiving cutter having cutter blades, each formed in the shape of a gear tooth along a staggered axis, has been used as a fly cutter rotated within a vacant space for skiving or cutting a work piece to be cut to form an internal spur gear.

This working process is highly efficient as compared with other usual cutting processes. However, since it has inevitably caused the staggered contact between the cutter and the work piece to be cut, analyzing design procedures thereof has been troublesome. Therefore, the analysis thereof was insufficient and unsatisfactory. For this reason, in order to effect, in turn, rough skiving and finish skiving, it has been necessary to interchangingly mount on a spindle of the cutter device a cutter selected from at least two cutters different from each other, that is, one is used for rough skiving and the other is used for finish skiving, thereby lowering the working efficiency in this respect.

Lately, such a gear skiving process has been theoretically analyzed at last. As a result, an interference diagram (which is described afterwards in detail) has been obtained on several theoretically analyzed values. By the diagram, it has been understood that a contacting or acting region between each cutter blade of the skiving cutter and each gear tooth of an internal spur gear to be obtained by skiving or cutting a work piece with the cutter is the portion on the diagram encompassed by respective interference lines at the root and bottom of the tooth formed on the work piece to be skived or cut and an interference line at the addendum of each blade of the cutter. Therefore, it has been understood that if each blade profile of the skiving cutter is designed such that the contacting point between each cutter blade of the skiving cutter and each gear tooth of an internal spur gear to be obtained by skiving or cutting a work piece is located within the contacting or acting region, a plurality of cutter gears can be mounted on the same spindle because the cutters can be set thereon in a predetermined vertical alignment.

This invention has been made in consideration of the above described view point.

SUMMARY OF THE INVENTION

It is an object of the present invention to provide a skiving cutter device for use in cutting an internal spur gear which can apply, in turn, rough and finish cuttings to a work piece to be cut in one working cycle, thereby remarkably improving the working efficiency.

It is another object of the present invention to provide a skiving cutter device for use in cutting an internal spur gear which enables the device to use a finish skiving cutter made of super hard tool material having a high wear-resisting property.

It is still another object of the present invention to provide a skiving cutter device for use in cutting an internal spur gear which can easily and accurately adjust both phases of respective cutter blades of rough and finish skiving cutters with each other and with their respective initial phases.

In accordance with a first aspect of the present invention, there is provided a skiving cutter device for use in cutting an internal spur gear which comprises rough and finish skiving cutters mounted in vertical alignment on a spindle of the device and spacers adapted to compensate respective distances between the cutters and a reference plane on the spindle, wherein respective cutter blades of the cutters are located in the same phase and each cutter blade profile of the cutters is designed such that the contacting point between each cutter blade of the cutters and each gear tooth formed on a work piece to be cut is located within a contacting or acting region encompassed by respective interference lines at the root and bottom of the gear tooth formed on the work piece and an interference line at addendum of each cutter blade of the cutters.

In accordance with a second aspect of the present invention, there is provided a skiving cutter device for use in cutting an internal spur gear which further comprises spiral key ways, each formed at the inner peripheral surface of the boss portion of each skiving cutter and having the same conversion pitch as that on the pitch circle of each cutter, and pin keys set up on the spindle and engaged with the spiral key ways, respectively, whereby both phases of the respective cutter blades of the rough and finish skiving cutters are easily and accurately adjusted with each other and with their respective initial phases.

BRIEF DESCRIPTION OF THE DRAWINGS

These and other objects, features and advantages of the present invention will become apparent from the following detailed description taken in conjunction with the accompanying drawings, in which.

DETAILED DESCRIPTION OF THE PREFERRED EMBODIMENTS

First of all, for better understanding of the present invention, an interference diagram between repective cutter blades of rough and finish skiving cutters and each gear tooth of an internal spur gear to be obtained by cutting a work piece with cutters will be described below with reference to FIG. 1.

Figure 1:
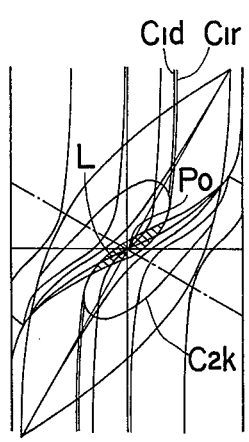
FIG. 1 is a diagram in which interference lines of respective addendams, roots, bottoms, etc., of each cutter blade of rough and finish skiving cutters and each gear tooth formed on a work piece to be cut.

In FIG. 1, reference characters $C_{1d}$ and $C_{1r}$ represent respective interference lines at the root and bottom of each gear tooth formed on the work piece to be cut and reference character $C_{2k}$ denotes an interference line at the addendum of one of the skiving cutters. The part encompassed by the interference lines $C_{1d}$, $C_{1r}$ and $C_{2k}$, namely, the region L indicated by oblique lines, is defined as a contacting or acting region between the respective cutter blades of the skiving cutters and each gear tooth of an internal spur gear to be obtained.

Thus, it has been understood that if respective cutter blade profile of the skiving cutters is designed such that the contacting point between respective cutter blades of the skiving cutters and each gear tooth of an internal spur gear to be obtained is located within the contacting or acting region, a plurality of skiving cutters can be mounted on the same spindle because the cutters can be set in vertical alignment thereon.

Figure 2:
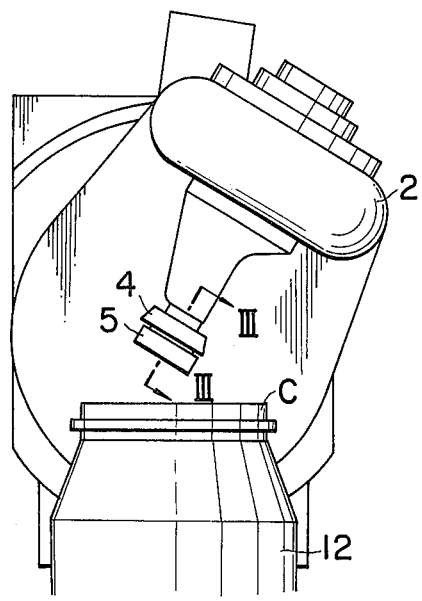
FIG. 2 is a vertical front view of a skiving apparatus equipped with a skiving cutter device according to one embodiment of the present invention.
Figure 3:
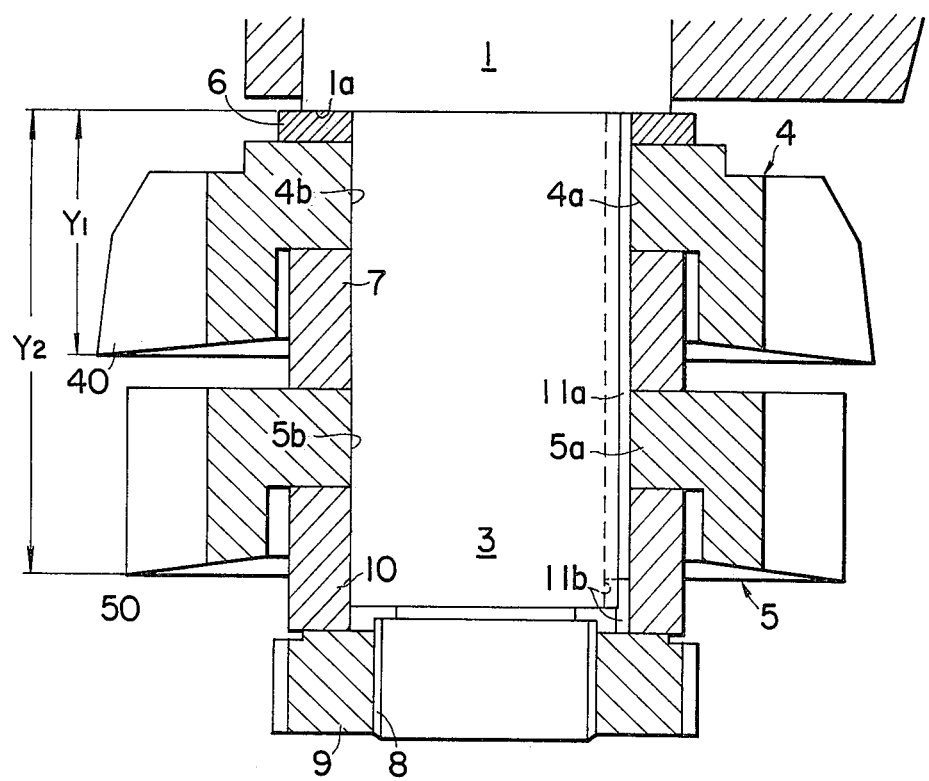
FIG. 3 is a longitudinal sectional view of the device taken along the line III—III in FIG. 2.
Figure 4:
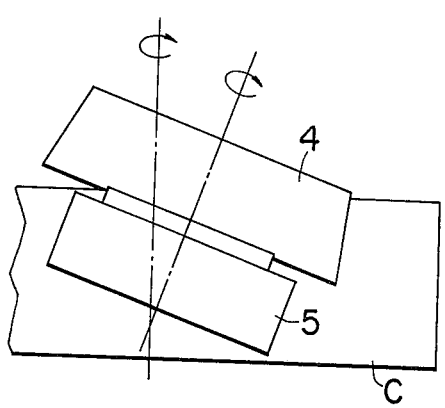
FIG. 4 is an explanatory view of the operation in the device shown in FIG. 3.

Referring to FIGS. 2 to 4, one embodied skiving cutter device of the present invention will now be described hereinafter in detail.

Reference numeral 1 represents a spindle mounted on a cutter head 2 of the device. The spindle 1 is provided with a finish skiving cutter 4 and a rough skiving cutter 5 which are mounted in vertical alignment with each other through spacers 6 and 7, respectively, at a fitting shaft part 3 of the spindle 1. Threadably engaged with a threaded part 8 of the spindle 1 is a nut 9 which urges through a collar 10 the rough skiving cutter 5 in the direction of the cutter head 2 so that both the cutters 4 and 5 are rigidly secured to the spindle 1. The finish and rough cutters 4 and 5, the spacers 6 and 7 and the collar 10 are all fixedly secured to the fitting shaft part 3 of the spindle 1 by means of a key 11a and key ways 11b. For the purpose of locating the contacting point between respective cutter blades 40 and 50 of the skiving cutters 4 and 5 and each gear tooth of an internal spur gear to be obtained by cutting a work piece C with cutters within the contacting or acting region L shown in FIG. 1, it is an important matter to maintain respective distances between the respective cutter blades 40 and 50 and the shoulder portion of the spindle, that is, a reference plane 1a at predetermined values, respectively, thereby obtaining accurate shape of each gear tooth formed on the work piece C to be cut.

Hence, each thickness of the spacers 6 and 7 may be changed in accordance with the change in each thickness of the cutters 4 and 5 caused by regrinding them to compensate the respective distances $Y_1$ and $Y_2$ between the respective cutter blades 40 and 50 in their original states and the reference plane 1a on the spindle 1.

In operation, the work piece C to be cut is fixedly secured on a setting jig 12 as shown in FIG. 2 and is rotated in the direction as indicated by the arrow in FIG. 4, whilst the spindle 1 is rotated in the same direction as that of the work piece C and then the spindle is moved upwards or downwards for applying rough cutting and finish cutting to the work piece C by the rough skiving cutter 5 and the finishing skiving cutter 4, respectively, to form an internal spur gear from the work piece C.

Figure 5:
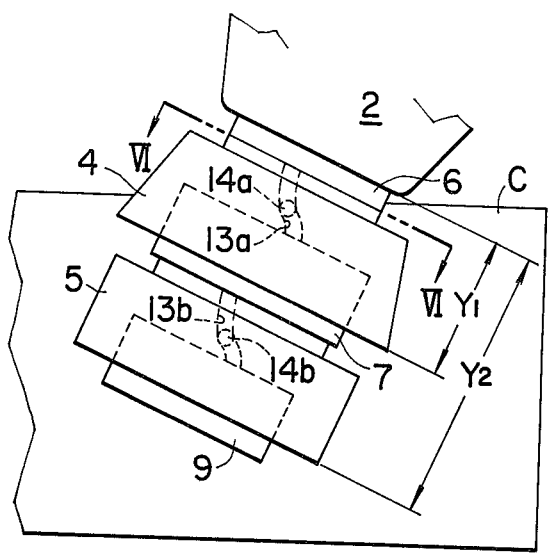
FIG. 5 is a fragmental vertical front view of a skiving cutter device according to another embodiment of the present invention.
Figure 6:
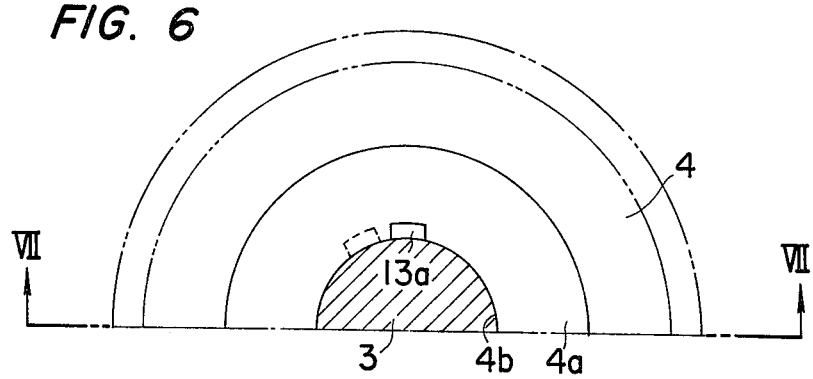
FIG. 6 is a partially cross sectional half view of the device taken along the line VI—VI in FIG. 5.
Figure 7:
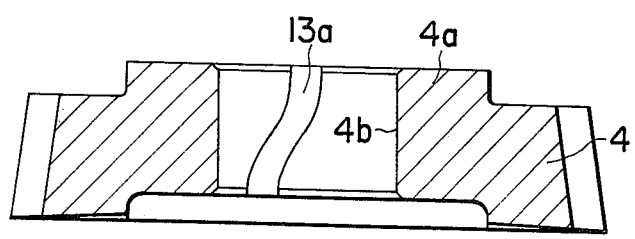
FIG. 7 is a vertically sectional view of a skiving cutter taken along the line VII—VII in FIG. 6.

Referring to FIGS. 5 to 7, another embodiment of the present invention will now be described hereinafter.

As shown in FIGS. 5 to 7, this embodiment is further provided with spiral key ways 13a and 13b formed at the respective peripheral surfaces of engaging holes 4b and 5b formed at the respective boss parts 4a and 5a of the cutters 4 and 5 and is provided with pin keys 14a and 14b set up on the fitting shaft part 3 of the spindle 1 so that the pin keys 14a and 14b are engaged with the spiral key ways 13a and 13b, respectively, when the cutters 4 and 5 are positively mounted on the spindle 1. In addition, since a conversion pitch of both the spiral key ways 13a and 13b is accorded with that on the respective pitch circles of the cutters 4 and 5, both phases of the respective cutter blades of the rough and finish skiving cutters 4 and 5 are easily and accurately adjusted with each other and with their respective initial phases at any time when the cutters 4 and 5 are positively mounted on the fitting shaft part of the spindle 1.

What is claimed is:

1. A skiving cutter device for use in cutting an internal spur gear comprising a spindle mounted on a cutter head, finish and rough skiving cutters having thereon cutter blades, each formed in a gear tooth, and mounted in vertical alignment on the spindle of said device and spacers adapted to compensate respective distances between said cutters and a reference plane on said spindle, wherein respective cutter blades of said cutters are located in the same phase and each cutter blade profile of said cutters is designed such that the contacting point between the respective cutter blades and each gear tooth formed on a workpiece to be cut is located within a contacting or acting region encompassed by respective interference lines at the root and bottom of the tooth formed on said workpiece to be cut and an interference line at the addendum of each cutter blade of said cutters, a key way located at least partially longitudinally of said spindle, wherein the cutters are adapted to operate upon said workpiece while mounted upon a receiving means and the longitudinal axis of said receiving means is offset from that of the spindle.

2. A skiving cutter device as set forth in claim 1, wherein the key way is a spiral key way, formed at the inner peripheral surface of the boss portion of each skiving cutter and having the same conversion pitch as that on the pitch circle of each cutter, with pin keys set up on the spindle and engaged with the spiral key ways, respectively, when said finish and rough skiving cutters are positively mounted on the spindle, whereby both phases of the respective cutter blades of the rough and finish skiving cutters are easily and accurately adjusted with respect to each other and with their respective initial phases at any time when the cutters are positively mounted on said spindle.

* * * * *